Oct. 12, 1943. J. R. HOBSON 2,331,687
METHOD OF AND MACHINE FOR FORMING HOLLOW ARTICLES OF PLASTIC MATERIAL
Filed May 13, 1938 3 Sheets-Sheet 1

Witness
W. B. Thayer

Inventor
John R. Hobson
by Brown + Parham
Attorneys

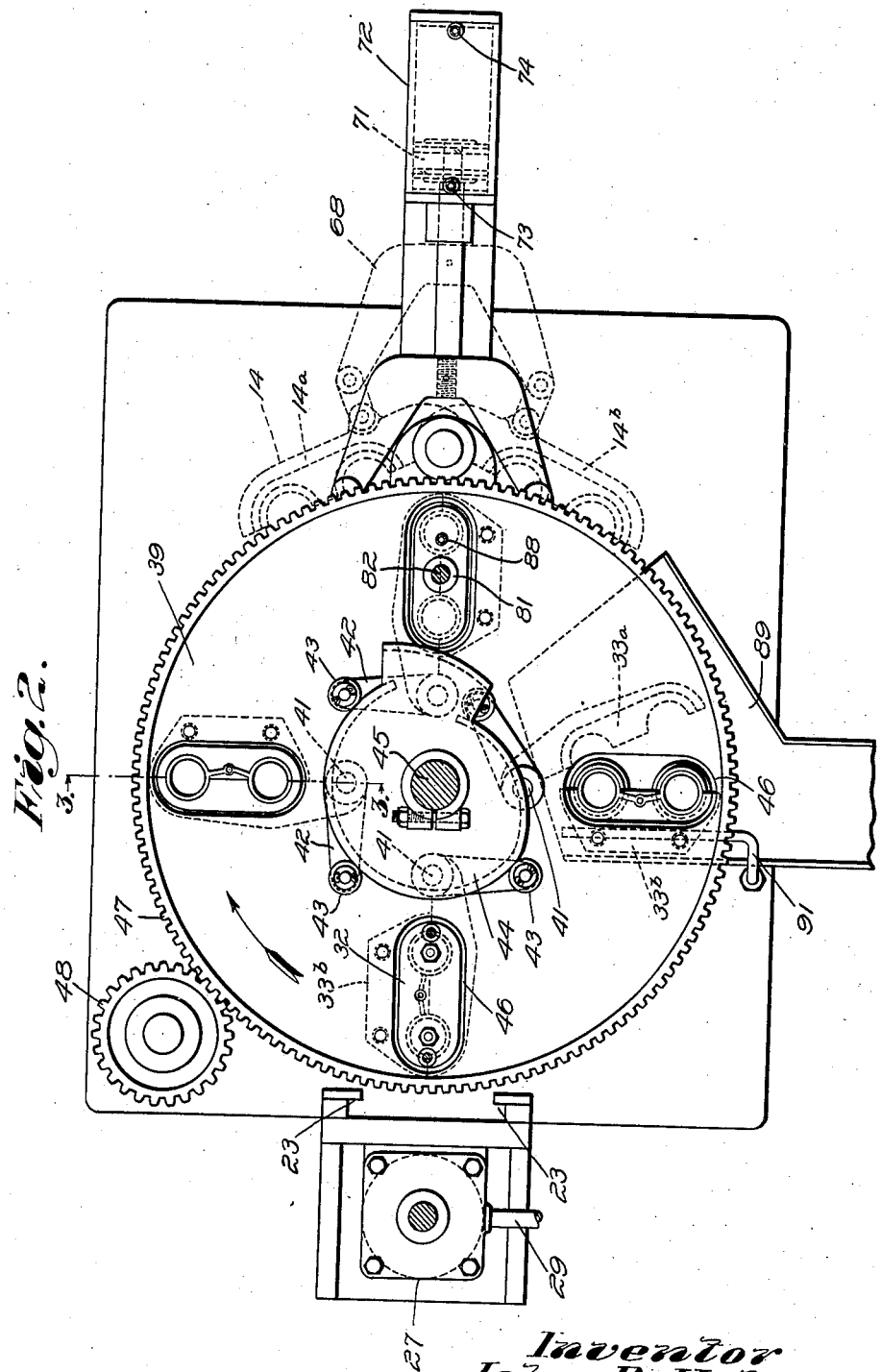

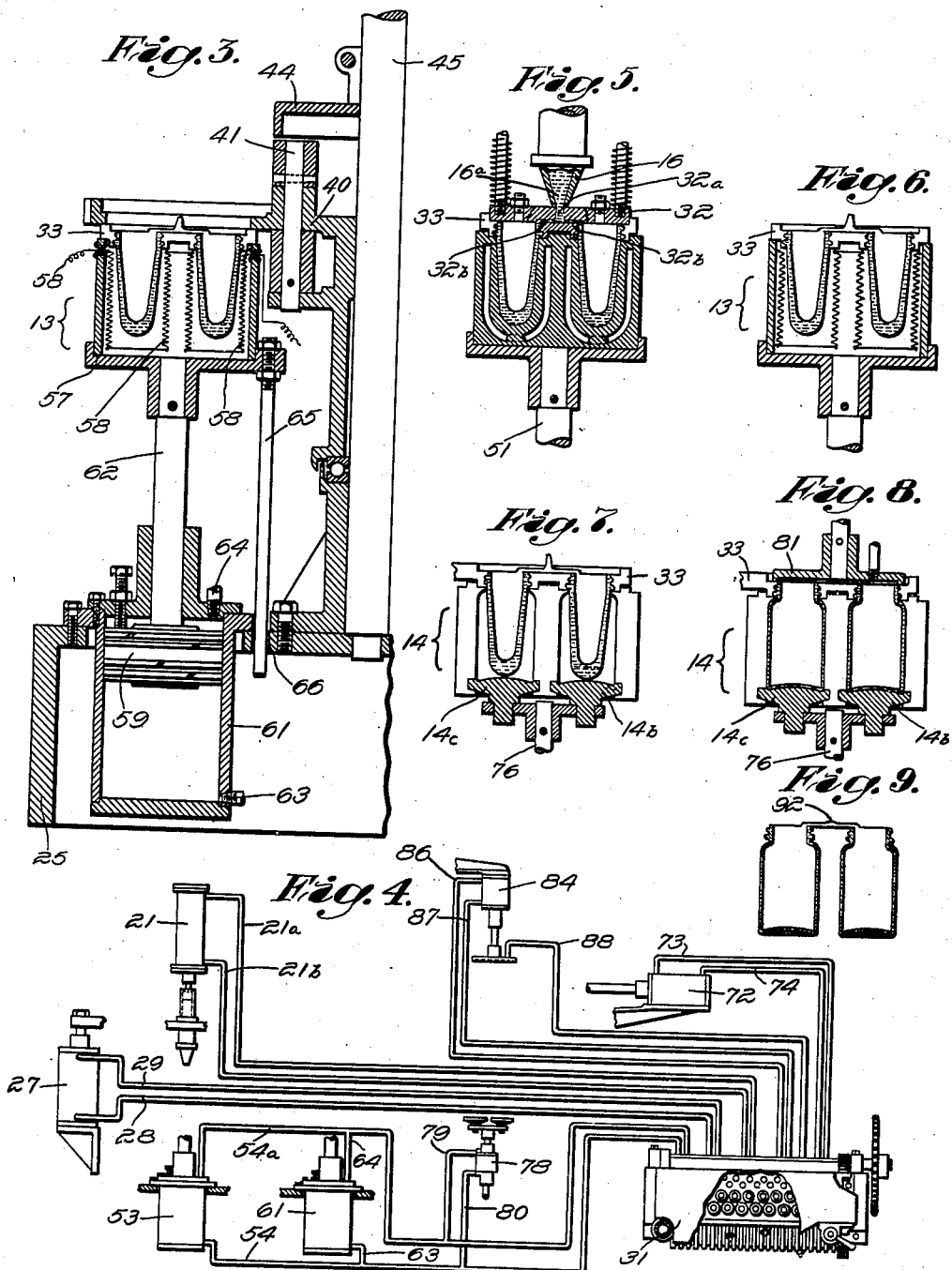

Patented Oct. 12, 1943

2,331,687

UNITED STATES PATENT OFFICE 2,331,687

METHOD OF AND MACHINE FOR FORMING HOLLOW ARTICLES OF PLASTIC MATERIALS

John R. Hobson, West Hartford, Conn., assignor to Hartford-Empire Company, Hartford, Conn., a corporation of Delaware Application May 13, 1938, Serial No. 207,699

8 Claims. (Cl. 18—5)

This invention relates to methods of and machines for forming hollow articles of organic plastic materials and has particular relation to such methods and machines wherein dies or molds are charged with the plastic material by injection.

In the art of molding organic plastic compounds, the term "injection molding" or such variations thereof as "injection system," "injection" or "injecting" means introducing an organic plastic compound into a plasticating and discharging device, rendering the compound fluent therein by the application of heat and pressure, delivering the fluent compound under pressure of the device into and filling the cavity of a closed mold or die, and thereafter separating the molded piece from the plastic material remaining in the device. The terms quoted above are used herein with the same meaning as they have in the art of molding organic plastic compounds. Such terms do not apply to "extrusion molding" wherein the organic plastic compound is not delivered to a closed die, as in injection molding, but is forced through a shaping die into the open air or into a space in which the material, at least initially, is unconfined or only partly confined by molding surfaces.

In the machines and methods employed prior to this invention in which the injection system was used, hollow articles usually have been formed in the dies by the use of permanent internal cores or formers, the hollow articles being completed in such dies by the injection operation. While certain types of hollow articles can satisfactorily be made in this way, there are other types of hollow articles which cannot be so made without the use of destructible cores, such articles being of the kind which have openings leading into the cavities thereof which are narrower than the cavities and which therefore prevent the use of internal formers or cores. Thus, the so-called narrow neck containers or bottles cannot be produced by the use of internal cores unless the cores are of the destructible type and the use of such cores has certain disadvantages.

A general object of this invention is to provide a novel method and novel machine for the production of hollow articles from organic plastic materials with the use of the injection system and by the employment of which narrow neck articles or containers may be produced.

A further object is to provide a novel method and novel machine in which a plurality of hollow articles may be formed simultaneously. This may be accomplished by successively forming a set of hollow blanks simultaneously at one position by injection molding and successively moving the sets of blanks to other positions where they may be operated upon to form the desired hollow articles while other sets are being formed or operated upon at preceding positions. This permits the use of a single plasticating and injection device at the injection molding position and provides for increased production of hollow articles from organic plastic materials.

Further objects and advantages of the invention will be pointed out in, or will become apparent from, the following detailed description of the embodiment of the invention disclosed in the accompanying drawings, in which Figure 1 is a view in central sectional elevation of a machine embodying the invention;

Fig. 2 is a view in horizontal sectional top plan of the machine shown in Fig. 1;

Fig. 3 is a fragmentary view of the machine shown in Figs. 1 and 2, said view being in vertical section taken substantially on the line 3—3 of Fig. 2, looking in the direction of the arrows on said line;

Fig. 4 is a diagrammatic view of the distribution of the fluid to various cylinders which operate parts of the machine shown in Figs. 1 and 2;

Figure 1:
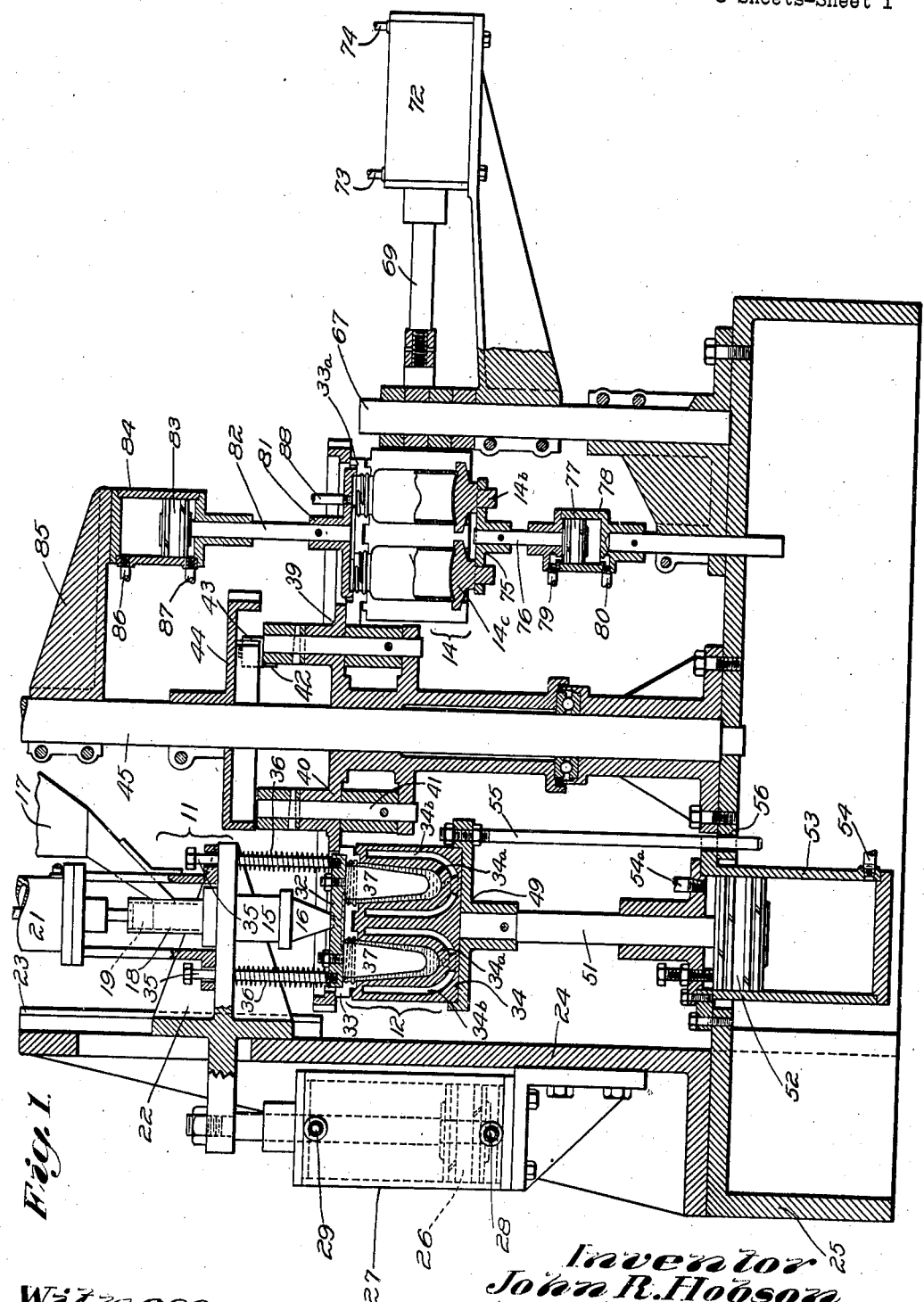

Figs. 5, 6, 7, and 8 are fragmentary detail views in vertical section of the dies or molds embodied in the machine of Figs. 1 and 2, said views depicting several steps in the performance of the novel method; and Fig. 9 is a view in vertical section of a plurality of articles made according to the invention.

Generally considered, the machine of the invention comprises an injection device indicated at 11, a blank forming die structure indicated at 12, a blank reheating device shown at 13, Figs. 3 and 6, and a blowing die or mold shown at 14, Figs. 1, 2 and 8.

The injection device 11 may be of conventional design and includes a vertical casing 15 terminating in a nozzle 16, through which plastic material is supplied to the die structure 12. The casing 15 and, if desired, the nozzle 16, are heated by suitable means not shown, and the pulverized plastic composition supplied thereto through a hopper 17 enters the chamber 15 from an upper supply chamber 18. In said chambers the pulverized material is subjected to pressure by a plunger 19 operated by a piston, not shown, in cylinder 21 which is connected by conduits 21a, 21b with a timer or fluid distributor 31, Fig.

4, which controls movement of said piston. Pressure of the piston 19 and the action of heat on the plastic material serves to plasticate it, that is, transforms it into a plastic workable condition and the piston 19 further serves to inject the hot plastic material into the die structure 12.

The injection device or the parts thereof are carried on a slide 22 which moves up and down between guides 23 on standard 24 carried by the base 25 of the machine. Such movement is effected at appropriate times by piston 26 in cylinder 27, which piston is connected to slide 22, as shown. Fluid pressure is admitted to and from cylinder 27 through pipes 28 and 29 which lead from timer or fluid distributor 31, Fig. 4.

The die structure 12 includes a head 32, four neck dies or molds 33 and a blank die or mold 34 with which the neck dies successively cooperate. The head 32 is carried by headed pins 35 which extend through the slide 22 and are connected at their bottom ends to the head. Springs 36 on the pins 35 serve to separate the head 32 and nozzle 16 when slide 22 is raised.

Head 32 carries the internal formers or cores 37 secured to the head by screws, as shown, and held in proper position to be centered in the cavities of the neck and blank mold dies 33 and 34.

Each neck die 33 preferably is made in halves 33a and 33b. Each neck mold half or section 33b is bolted or otherwise secured to the underside of the neck mold carrier or spider 39 (see Fig. 2) while each half 33a of the neck die is secured to the lower end of a pivot 41, Figs. 1 and 2, which is suitably journaled in the hub portion 40 of the carrier 39. The upper end of each pivot 41 carries a crank 42 having cam roller 43 thereon, which cooperates with cam 44 mounted on the column 45 about which the carrier rotates, to open or close the dies at the desired times in response to rotation of the carrier.

Each neck die is located below a radially extending slot or opening 46 in the carrier 39, to permit the head 32 and formers 37 carried thereby, and also the nozzle 16 of the injection device 11, to be moved downwardly through the table into cooperative relation with one of the neck dies 33 and blank mold die 34. Thus the injection device, head and formers and the blank die 34 are adapted to successively cooperate with each of the four neck dies 33 as the carrier 39 moves them successively to the position shown in Fig. 1. This position is referred to herein as the first or injection position. The carrier or table 39 may be rotated step by step by suitable mechanism, which may include ring gear 47 on the periphery of the carrier, engaged by spur gear 48 driven by suitable power means, not shown. In the machine illustrated, the carrier 39 is rotated in clockwise direction.

The blank mold or die 34 contains the blank forming cavities, 34a of the desired shape and size for the formation of blanks therein in cooperation with the formers 37 and neck mold 33 which forms neck finishes on the blanks. The die 34 preferably has chambers 34b formed therein which surround the mold cavities and through which temperature-controlling medium may be circulated. Though not shown in the drawings, similar provision may be made in the neck die 33 and cores 37.

The die 34 also may be formed in sections, but in the illustrated construction, it is formed as a unit and mounted in a carrier 49 secured to the upper end of rod 51 of piston 52 in cylinder 53. The piston 52 is reciprocated by the supply and exhaust of fluid pressure to and from the cylinder through conduits 54 and 54a which lead from the distributor 31, Fig. 4. This serves to raise the die 34 into engagement with the neck die 33, as shown in Fig. 1, and to lower it out of such engagement. To assure that the cavities 34a of the die 34 will remain in radial alignment with the neck mold cavities and cores 37, a guide rod 55, Fig. 1, is connected to the member 49, this rod sliding through an opening 56 in the base of the machine.

Located at the position beyond the injection position, that is, at the second or reheating position, is the heating device 13, Fig. 3, which includes a casing or shell 57 containing electric heating elements 58 of cylindrical form which are adapted to surround blanks carried by the neck die 33 when the heating device 13 is raised into its upper position by piston 59 and cylinder 61. The rod 62 of piston 59 carries the said heating device. Cylinder 61 has connections 63 and 64 with the fluid distributor 31. The heating device 13 likewise is held in radial position by a rod 65 which slides in an opening 66 in the base of the machine.

At the station beyond the second or blank heating position, that is, at the third or blowing position, in the machine, there is located the blowing mold 14 preferably made in halves 14a and 14b pivoted on stud 67. Said sections are opened and closed by a mechanism including cross-head 68, rod 69 and piston 71 in the cylinder 72. Cylinder 72 has the conduits 73 and 74 which lead to the distributor 31. Associated with mold 14 are mold bottoms 14c and 14d carried by a cross member 75 on rod 76 of piston 77 in cylinder 78. Cylinder 78 has conduits 79 and 80 leading to the fluid distributor 31. By means of this arrangement, the bottom members 14c—14d may be raised and lowered into and out of position to be enclosed by the mold sections 14a—14b.

In order to supply fluid under pressure to hollow blanks to be blown in the blow mold, I provide a blow head 81 secured to the lower end of rod 82 of piston 83 in cylinder 84 carried by a bracket 85 secured to column 45 of the machine. Cylinder 84 has conduits 86 and 87 leading from the distributor 31. Thus the blow head may be lowered into engagement with a neck die or mold 33 and fluid under pressure supplied through a conduit 88 connected to said blow head and leading from distributor 31, Fig. 4.

At the fourth or discharge position, hollow articles formed in the blow mold at the third position may be discharged from the machine into a chute, indicated at 89, by the movement to open position of the section 33a of the neck die, this movement being effected by the action of cam 44 as the neck die moves into the fourth position. In the event that articles do not free themselves from the neck die, they may be freed, upon further movement of the table, by striking a rod 91, Fig. 2, which is located in the path of such articles.

Performance of my novel method by the apparatus above described is as follows: As one of the neck dies moves to the first position where the injection device 11 is located, the section 33 thereof is closed by cam 44, and as the carrier comes to rest, slide 22 is lowered, which projects the internal formers 37 downwardly through the neck mold cavities, engages head 32 with the neck mold and also presses the nozzle 16 of the injection device into engagement with the head or plate 32 which is moved into contact with the neck die 33. As this operation is occurring or, if preferred, after it is completed, the blank or body die 34 is raised by piston 52 into engagement with the neck die 33. It will be observed that the neck die 33 is recessed to receive the head 32 and the blank die 34 is recessed to receive portions of the neck die 33 and lock it in closed position. The parts of the die structure being thus held in assembled relation, a charge of plastic material is now injected from nozzle 16 through the narrow discharge opening 16a thereof, see Fig. 5, into sprue passage 32a and gates 32b formed in the plate 32.

By reference to Figs. 1 and 5, it will be observed that the plastic material flows through the gates 32a, 32b into the neck mold cavities downwardly through said cavities into the blank mold cavities until all of such passages and cavities are filled and the blanks are formed, as shown in Figs. 1 and 5.

After this injection operation, the slide 22 is raised which first disengages nozzle 16 and plate 32 and later raises the plate and the cores 37 from within the blanks into positions clear of the path of carrier 39. The blank die also is lowered into position to clear the blanks left suspended from the neck die 33 and the table is now turned to carry the blanks to the second or reheating position, where they may be reheated by the heating device 13, as shown in Fig. 6. Though not illustrated in the drawings, suitable means also may be located at this position which can be lowered into the cavities of the blanks to heat them from the interior thereof. During the reheating operation at the second position, another set of blanks will be formed in the next neck die 33 and the blank die 34, and at the appropriate time the carrier 39 rotates and the second set of blanks is moved to the second or reheating position and the first set moved to the third or blowing position.

At the third position, the blow mold is closed about the blanks, as shown in Fig. 7, after which the blow head 81 is lowered and the blanks blown to final shape, as shown in Fig. 8. During this operation, a third set of blanks will be formed by injection at the first or injection position and a second set of blanks will be heated at the second position. The next turn of the table brings the expanded articles formed from the first set of blanks to the fourth or discharge position for discharge into the chute 89. The finished article thus discharged may be of the type shown in Fig. 9, which shows two narrow neck containers or bottles, and it will be noted that such articles are connected by gate material, as indicated at 92. It will be understood that such material is removed where it joins the articles by a simple cutting operation.

Various changes may be made in the method procedure and in the details of apparatus without departing from the scope of the appended claims.

The invention is not limited to the use of any particular type of organic plastic material but may be employed in forming hollow articles from any kind of organic plastic capable of being rendered plastic by heat or heat and pressure and molded into articles. Such plastic material may be either of the thermoplastic or thermosetting type. The above description of the invention may be assumed to be directed to production of articles from a thermoplastic organic material, such as cellulose acetate with suitable plasticizer and substantially free of solvents. In the formation of articles from such material, it may be desirable to cool the blanks somewhat in the blank die 34 to prevent sticking of the material to the formers 37 in the die cavities. The blank die 33 may, if desired, be cooled at all times and the blowing die or mold 14 also preferably is cooled at all times, although the means for effecting such cooling are not shown. Hot air or other fluid may be employed for the blowing or expanding operation, and if such heated medium is employed, it will assist the reheating of the material in the blanks, supplementing the heat treatment received at the third position.

If the invention is employed in forming articles from thermosetting material, the die parts will be heated to cause such material to react and parts not heated or cooled to prevent premature hardening.

As the blanks arrive at the heating or reheating position they will retain more or less of the initial heat of the injected plastic material, depending upon the extent to which the blanks are cooled to permit withdrawal of cores 37 and removal of the blanks from the blank body die 34. The initial heat of the material will serve to reheat the chilled surfaces of the blanks to greater or less extent in accordance with the relation of the thickness of the blanks to the area of the chilled surfaces. This reheating is supplemented by the heating device 13 which by proper regulation of electric current, insures that the blanks will be sufficiently plastic when they reach the blowing or expanding position, to be expanded to final form. The use of a heated expanding medium, such as hot air, oil or water, may reduce the amount of heating at the heating position necessary for the proper expansion of the blanks.

Inasmust as the blanks are formed by injection molding, they can be formed in predetermined shape and dimensions and therefore they can be formed in such predetermined shape that the desired distribution of plastic material in the blown finished articles is obtained. This permits making the walls of the articles thinner than in other methods, because the walls of the articles may be made more uniform. Not only may articles of improved quality be made according to this invention by injection molding, but certain types of articles, such as "narrow neck" articles, can be produced which can not be produced by ordinary injection molding. Furthermore, by performing certain operations on the blanks, such as heating and blowing, while other blanks are being injection molded in the same die and with the same injection apparatus as is used to form the blanks being heated and blown, and by forming and shaping a plurality of blanks simultaneously, articles of improved quality may be produced at an exceptionally high rate of speed and with the use of less equipment and at lower cost than would appear to be possible.

Having thus described my invention, what I claim is:

1. A machine for forming hollow articles from organic plastic material comprising an injection device including a piston for plasticating and injecting such material into a die, blank forming dies comprising a series of neck dies and a blank body forming die, a blow mold, means for actuating said injection device and said blank body forming die to successively and periodically move them into and out of engagement with said neck dies to form a series of blanks by injection molding, means for moving said neck dies successively into cooperative relation to said blow mold to transfer said blanks thereto, means for closing said mold about each blank, and means for expanding each blank to final form in said mold.

2. A machine for forming hollow articles of organic plastic material comprising blank forming dies, an injection device including a piston for plasticating such material and injecting it into said dies, means for automatically actuating said injection device and the piston thereof to successively fill said dies to form blanks of such material in said dies by injection molding, a blow mold, means for automatically and successively transferring said blanks to said blow mold, and automatic means for successively expanding said blanks to final form in said blow mold.

3. A machine for forming hollow articles of organic plastic material comprising means for molding blanks of said material, a device for plasticating such material and for successively injecting such material into said molding means to form said blanks by injection molding, means for expanding said blanks to final form, means for transferring said blanks to the last-named means, means for actuating said molding means, said device, said blank transferring means and said blank expanding means, and means for automatically controlling the operation of said actuating means in predetermined time relation to successively form blanks of organic plastic material by injection molding and to successively expand said blanks to final form, and to injection mold a blank while a preceding blank is being expanded to final form.

4. A machine for forming hollow articles of organic plastic material comprising blank forming dies, a device for plasticating and injecting such material into said dies to form blanks therein by injection molding, means for heating said blanks, means including a blow mold for expanding said blanks to final form, and means for actuating and synchronizing the operation of said dies, said device, said heating means and said blank expanding means in predetermined time relation to successively form, heat and expand to final form a series of blanks and to form one blank while another blank is being heated and still another blank is being expanded to final form.

5. A machine for forming hollow articles of organic plastic material comprising a carrier, a series of neck dies mounted on said carrier and movable thereby to an injection molding position, a heating position and an expanding position, a blank body die at said first named position, means for successively engaging said blank body die with said neck dies, an injection device at said first-named position including a piston for plasticating such material and injecting it into said blank body die, means for successively engaging said device with said neck dies to successively inject such material into said neck dies and said blank body die to successively form blanks at said injection molding position, a heating device at the heating position for successively heating said blanks, a blow mold at the expanding position, means for successively closing said mold about the blanks at such expanding position, and means for successively applying expanding medium to said blanks at said expanding position.

6. The method of forming hollow articles from organic plastic material which comprises placing within suitable heating and injecting means a charge of such material in the solid state and plasticating such material by heat and pressure in an injection device, injection molding blanks having neck and body portions in a blank forming die and connecting the blanks with gate material integral with the neck portions of said blanks in injection molding the blanks, expanding said blanks to final form, and removing the gate material attached to the neck portions of the articles.

7. A machine for forming hollow articles from organic plastic material by injection molding and blowing which comprises a blank forming die comprising a body forming die and a neck forming die, an injection device including a piston for plasticating such material and injecting it into said blank forming die, actuating means for bringing said body forming die and said injection device with said neck forming die on opposite sides thereof into assembled relation, and for operating said piston to fill the blank forming die through said neck forming die to form a blank by injection molding, a blow mold, means for transferring said blank to said blow mold, means for expanding said blank to final form in said blow mold, and automatic means for causing said actuating means, said transferring means and said expanding means to operate in predetermined time relation in regularly recurring cycles.

8. A machine for forming hollow articles from organic plastic material by injection molding and blowing, comprising a blank forming die, an injection device including a piston for plasticating such material and injecting it into said die to form blanks therein by injection molding, said blank forming die comprising a body blank die and a neck forming die, said neck forming die comprising a sectional ring mold and a plate engaging said ring mold, said plate having a sprue passage therein for receiving plastic material from said injection device to charge said blank forming die, automatic means for actuating said injection device and the parts of said blank forming die to bring them into assembled relation periodically and to form blanks periodically by injection molding, a blow mold, means for automatically and periodically actuating said ring mold to transfer blanks to said blow mold, and means for automatically and periodically blowing said blanks in said blow mold.

JOHN R. HOBSON.